(12) United States Patent
Ayres et al.

(10) Patent No.: US 10,394,029 B2
(45) Date of Patent: Aug. 27, 2019

(54) FIELD OF VIEW ENHANCEMENT

(71) Applicant: Akonia Holographics LLC, Longmont, CO (US)

(72) Inventors: Mark R. Ayres, Boulder, CO (US); Adam Urness, Louisville, CO (US)

(73) Assignee: Akonia Holographics, LLC, Longmont, CO (US)

(*) Notice: Subject to any disclaimer, the term of this patent is extended or adjusted under 35 U.S.C. 154(b) by 0 days.

(21) Appl. No.: 15/479,272

(22) Filed: Apr. 4, 2017

(65) Prior Publication Data
US 2017/0285349 A1 Oct. 5, 2017

Related U.S. Application Data

(60) Provisional application No. 62/317,974, filed on Apr. 4, 2016, provisional application No. 62/412,728, filed on Oct. 25, 2016, provisional application No. 62/447,305, filed on Jan. 17, 2017.

(51) Int. Cl.
G06K 9/32 (2006.01)
G02B 27/01 (2006.01)
H04N 1/58 (2006.01)
H04N 1/409 (2006.01)
G02B 5/18 (2006.01)
G02B 5/32 (2006.01)

(52) U.S. Cl.
CPC .......... *G02B 27/0172* (2013.01); *G02B 5/18* (2013.01); *H04N 1/4092* (2013.01); *H04N 1/58* (2013.01); *G02B 5/32* (2013.01); *G02B 2027/011* (2013.01); *G02B 2027/0174* (2013.01); *G02B 2027/0178* (2013.01)

(58) Field of Classification Search
CPC ... G02B 5/1861; G02B 6/0033; G02B 27/017
USPC ............... 359/15, 34, 31, 573; 385/37, 146; 345/7, 8; 248/208.4; 382/266
See application file for complete search history.

(56) References Cited

U.S. PATENT DOCUMENTS

| 7,245,408 B1* | 7/2007 | Huang ............... G03H 1/02 359/24 |
| 7,418,170 B2* | 8/2008 | Mukawa ........... G02B 6/0033 359/15 |
| 7,502,168 B2* | 3/2009 | Akutsu ............. G02B 5/1861 359/15 |
| 9,349,165 B2* | 5/2016 | Cho .................. G06T 5/003 |
| 2009/0309811 A1* | 12/2009 | Hinton ............. G02B 27/017 345/8 |
| 2015/0077312 A1* | 3/2015 | Wang ............... G02B 27/017 345/7 |

* cited by examiner

Primary Examiner — Audrey Y Chang
(74) Attorney, Agent, or Firm — Michael H. Lyons

(57) ABSTRACT

An optical reflective device for reflecting light including a grating medium having a first and second grating structure is disclosed. The first grating structure may be configured to reflect light of a wavelength about a first reflective axis offset from a surface normal of the grating medium at a first incidence angle. The second grating structure may be configured to reflect light of the wavelength about a second reflective axis offset from the surface normal of the grating medium at a second incidence angle different from the first incidence angle. The second reflective axis may be different from the first reflective axis.

20 Claims, 12 Drawing Sheets

FIELD OF VIEW ENHANCEMENT

CROSS-REFERENCE TO RELATED PATENT APPLICATIONS

This application claims priority from U.S. Application Nos. 62/317,974, filed 4 Apr. 2016 and titled "SKEW MIRROR FIELD OF VIEW ENHANCEMENTS," 62/412,728, filed 25 Oct. 2016 and titled "SKEW MIRROR HAVING ENHANCED FIELD OF VIEW," and 62/447,305, filed 17 Jan. 2017 and titled "SKEW MIRROR HAVING ENHANCED FIELD OF VIEW." The above applications are incorporated herein by reference for all purposes, in their entireties.

FIELD OF TECHNOLOGY

The present disclosure relates generally to optical reflective devices, and more specifically to field of view (FoV) enhancement techniques.

BACKGROUND

An optical system may be utilized in a head mounted device (HMD), augmented reality (AR), or virtual reality (VR) application to project an image to an eye box. In some cases, an optical waveguide may be used to project the image to an eye box that may be a distance from the waveguide. Optical waveguides have a physical structure that guides electromagnetic waves in the optical spectrum (e.g., light). An optical waveguide can use total internal reflection (TIR) to guide light to an output. For example, an optical device may be located in the optical waveguide to project the image to an eye box. It may be advantageous for the optical device to magnify a FoV of the projected image.

SUMMARY

The described features generally relate to one or more improved methods, systems, or devices for FoV enhancement. The methods, systems, or devices may employ one or more FoV enhancement techniques to change the overall FoV dimensions of a projected image and/or enhance the FoV perception of a user using an HMD or viewing another display application.

In accordance with aspects of the subject technology, an optical device may include a grating medium, a first grating structure within the grating medium, the first grating structure being configured to reflect light of a wavelength about a first reflective axis offset from a surface normal of the grating medium at a first incidence angle, and a second grating structure within the grating medium, the second grating structure being configured to reflect light of the wavelength about a second reflective axis offset from the surface normal of the grating medium at a second incidence angle different from the first incidence angle, the second reflective axis being different from the first reflective axis.

In some examples, of the optical device described above, the first incidence angle and the second incidence angle may differ by at least 5°. In some examples of the optical device described above, the second incidence angle may be greater than the first incidence angle.

Some examples of the optical device described above may also include a third grating structure within the grating medium, the third grating structure including a plurality of grating vectors, each of the plurality of grating vectors having a grating angle that covaries with a grating frequency associated with the third grating structure.

In some examples of the optical device described above, the third grating structure may be configured to reflect light of the wavelength such that an incidence angle change of a first angular value between consecutive incidence angles associated with the plurality of grating vectors results in a reflective angle change of a scaling factor multiplied by the first angular value between corresponding reflective angles associated with the consecutive respective incidence angles.

In some examples of the optical device described above, each grating vector of the plurality of grating vectors of the third grating structure corresponds to a respective incidence angle. In some examples of the optical device described above, the third grating structure may be configured to reflect light of the wavelength about a reflective axis corresponding to a respective grating vector at the respective incidence angle. In some examples of the optical device described above, the respective incidence angle for each grating vector may have a value between 65° and 77° with respect to the grating medium.

In some examples of the optical device described above, the first grating structure may be further configured to reflect light of the wavelength about the first reflective axis offset from the surface normal of the grating medium at a first range of incidence angles including the first incidence angle. Each incidence angle of the first range of incidence angles may be less than the second incidence angle.

In some examples of the optical device described above, the first grating structure comprises at least three holograms, each of the at least three holograms corresponding to a unique incidence angle within the first range of incidence angles. A grating vector for each of the at least three holograms have a same value (e.g., a same angle, a same magnitude, a same frequency, etc.).

In some examples of the optical device described above, the first grating structure comprises at least three holograms, each of the at least three holograms corresponding to a unique incidence angle within the first range of incidence angles. An adjacent $|\Delta K_G|$ for the at least three holograms may have a mean value that resides between $1.0\times10^4$ and $1.0\times10^6$ radians per meter (rad/m).

In some examples of the optical device described above, at least one of the first grating structure or the second grating structure may comprise a hologram. In some examples of the optical device described above, at least one of the first grating structure or the second grating structure may comprise a sinusoidal volume grating.

In some examples of the optical device described above, the wavelength comprises one of: a visible red light wavelength, a visible blue light wavelength, or a visible green light wavelength.

In some examples of the optical device described above, the first grating structure may be further configured to reflect light of a plurality of wavelengths at the first incidence angle and the second grating structure may be further configured to reflect light of the plurality of wavelengths at the second incidence angle. In some examples of the optical device described above, the second grating structure may be at least partially non-overlapping with the first grating structure.

Some examples of the optical device described above may also include a second grating medium disposed in a waveguide different from a waveguide in which the grating medium may be disposed. Some examples of the optical device described above may also include a fourth grating structure within the second grating medium, the fourth grating structure being configured to reflect light of a second wavelength different from the wavelength about a fourth reflective axis offset from the surface normal of the second grating medium at the first incidence angle, the fourth reflective axis being substantially parallel to the first reflective axis. Some examples of the optical device described above may also include a fifth grating structure within the second grating medium, the fifth grating structure being configured to reflect light of the second wavelength about a fifth reflective axis offset from the surface normal of the second grating medium at the second incidence angle, the fifth reflective axis being substantially parallel to the second reflective axis.

In some examples, an optical device or system may include a light source for providing image-bearing light, an optical lens, and a pre-distortion manager for applying a blur kernel to a pixel proximal to an edge of a FoV associated with an image of the image-bearing light. The optical lens may comprise a light input section of the optical lens for receiving the image-bearing light and a grating medium disposed within the optical lens operatively coupled to the light input section.

Some examples of the optical device or system described above may also include a periphery light source proximal to an edge of the optical lens. Some examples of the optical device or system described above may also include a light projection manager for controlling the periphery light source.

Some examples of the optical device or system described above may also include a first grating structure within the grating medium, the first grating structure being configured to reflect light of a wavelength about a first reflective axis offset from a surface normal of the grating medium at a first incidence angle, and a second grating structure within the grating medium, the second grating structure being configured to reflect light of the wavelength about a second reflective axis offset from the surface normal of the grating medium at a second incidence angle different from the first incidence angle, the second reflective axis being different from the first reflective axis.

A method is described. The method may include reflecting, by a first grating structure within a grating medium, at least a first portion of light of a wavelength incident upon the grating medium at a first incidence angle about a first reflective axis offset from a surface normal of the grating medium and reflecting, by a second grating structure within the grating medium, at least a second portion of the light of the wavelength incident upon the grating medium at a second incidence angle about a second reflective axis offset from the surface normal of the grating medium, the second incidence angle being different from the first incidence angle and the second reflective axis being different from the first reflective axis.

Some examples of the method described above may also include reflecting, by a third grating structure within the grating medium and including a plurality of grating vectors, at least a third portion of light of the wavelength such that an incidence angle change of a first angular value between consecutive incidence angles associated with the plurality of grating vectors results in a reflective angle change of a scaling factor multiplied by the first angular value between corresponding reflective angles associated with the consecutive respective incidence angles.

Figure 1:
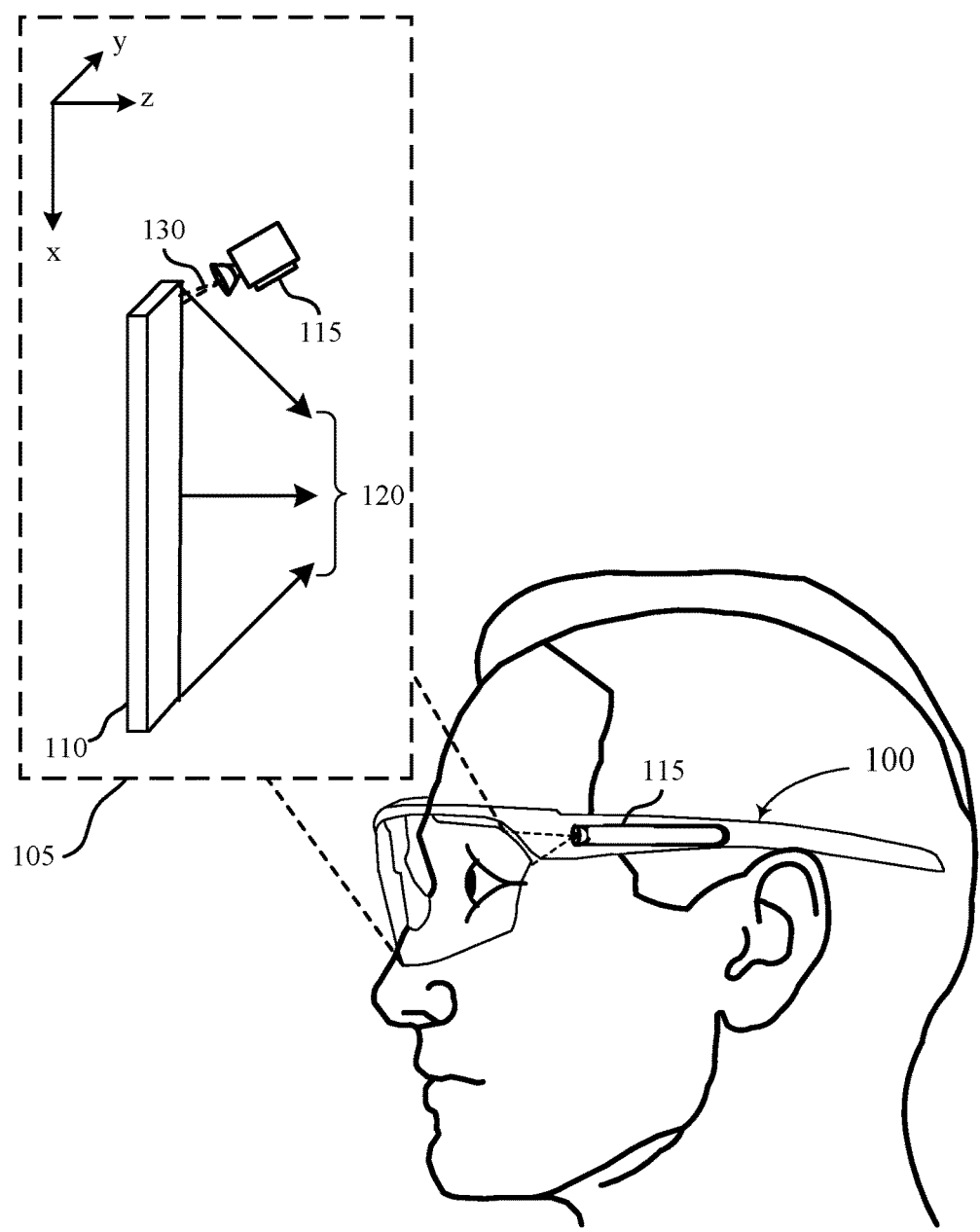
FIG. 1 illustrates an example of a head mounted display that supports FoV enhancement in accordance with aspects of the present disclosure.

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

An optical HMD is a wearable device that has the capability of reflecting projected images as well as allowing a user to experience augmented reality. Head-mounted displays typically involve near-eye optics to create "virtual" images. In the past, HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. To increase the FoV of the projected image, an optical device may employ skew mirror technology and principles so that edges of the FoV are magnified in the diffraction process. In some examples, the optical device may be modified to produce a larger FoV in one dimension (e.g., a horizontal FoV). In some examples, the optical device may be modified to produce a larger FoV in two dimensions. In some cases, cylindrical and foveated FoV enhancements may be used to magnify the FoV at the periphery of the projected image. Additionally or alternatively, a FoV perception of the optical device may be enhanced by coordinating peripheral light sources with the edges of the FoV for image-bearing light projected to the eye box.

In some cases, optical devices that magnify a FoV in the diffraction process may introduce anamorphic distortion to portions of the projected image (e.g., at a periphery of the projected image). For example, an optical device employing FoV enhancement may cause the pixels in the periphery of the projected image to be stretched horizontally. In some cases, the pixels at the periphery may reduce the resolution of the projected image at the edges of the FoV. In some cases, the pixels at the periphery may exhibit chromatic blur. To increase the resolution of the projected image at the edges of the FoV and reduce chromatic blur, an optical device may employ cylindrical and foveated FoV enhancement techniques to offset anamorphic distortion resulting from magnification of the FoV using the diffraction process. Further FoV enhancement techniques may be employed to counter distortion to the projected image.

Aspects of the disclosure are initially described in the context of an apparatus for reflecting light towards an eye box situated at a fixed distance away from a skew mirror or coupler using skew mirror principles. Specific examples are described for apparatus including a grating medium. The grating medium may include one or more grating structures. A grating structure may be configured to reflect light of a particular wavelength about a reflective axis offset from a surface normal of the grating structure at a particular plurality of incident angles. Aspects of the disclosure are further illustrated by and described with reference to apparatus diagrams, system diagrams, and flowcharts that relate to FoV enhancement.

This description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different from that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of a head mounted device (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides a volume hologram or other grating structure. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched to the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the angle of diffraction is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be superimposed within the grating medium of the skew mirror 110. The skew mirror 110 may have a substantially constant reflective axis (i.e., each grating structure of the skew mirror 110 has a same substantially constant reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

Inventive aspects of the present disclosure are illustrated by the non-limiting examples of FIG. 1. For example, an imaging component may include a light source (e.g., light source or light projector 115) for providing image-bearing light and an optical lens for FoV enhancement. The optical lens may include a light input section of the optical lens for receiving the image-bearing light and a grating medium disposed within the optical lens operatively coupled to the light input section. In some examples, the grating medium may include a first grating structure and a second grating structure. The first grating structure may be configured to reflect light of a wavelength about a first reflective axis offset from a surface normal of the grating medium at a first incidence angle. The second grating structure being configured to reflect light of the wavelength about a second reflective axis offset from the surface normal of the grating medium at a second incidence angle different from the first incidence angle. The second reflective axis may be different from the first reflective axis.

Additional examples and various implementations are contemplated using the light homogenizing techniques described herein.

Figure 2A:
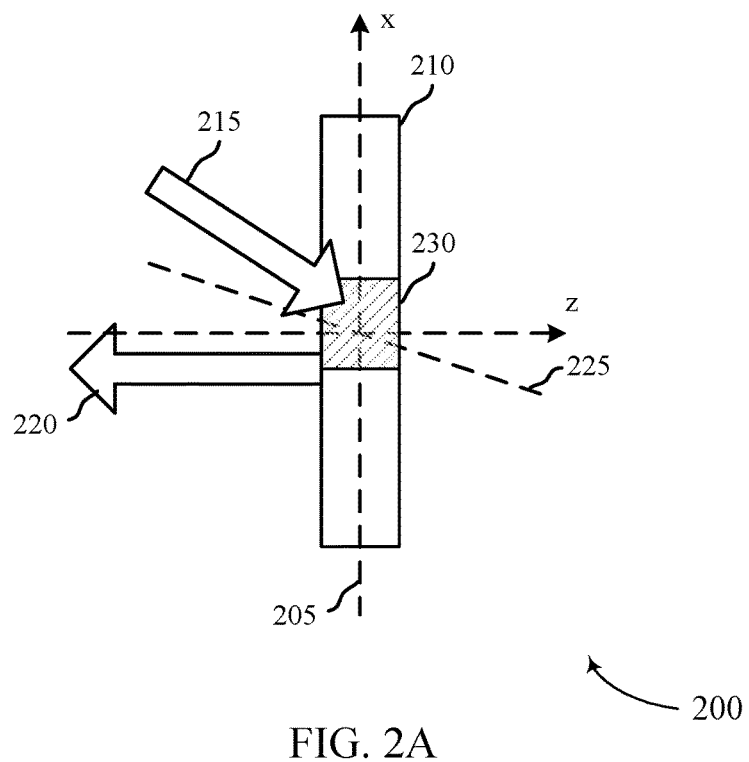
FIG. 2A is a diagram illustrating reflective properties of a skew mirror in real space that supports FoV enhancement in accordance with aspects of the present disclosure.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror and/or skew mirror-like diffractive optical element for FoV enhancement may be partially reflective. In this manner, a skew mirror for FoV enhancement may be configured to selectively reflect the rays of light where they are needed to form an exit pupil towards an eye box to enlarge an FoV, for example. The skew mirror and/or skew mirror-like diffractive optical element for FoV enhancement may employ pupil equalization techniques and be configured to avoid reflecting the rays of light for certain incidence angles where such a reflection would reflect the rays of light to an area that is not toward the desired exit pupil. Implementations of some skew mirror embodiments may require relatively high dynamic range recording medium to achieve high reflectivity over a relatively wide wavelength bandwidth and angle range for the resulting grating medium. In some cases, a skew mirror for FoV enhancement using pupil equalization techniques may require less dynamic range thereby allowing each hologram to be stronger (e.g., recorded with a greater intensity and/or longer exposure time). A skew mirror and/or skew mirror-like diffractive optical element composed of stronger holograms may provide a brighter image, or allow a dimmer light projector to provide an image of equal brightness.

The skew mirror 210 is characterized by the reflective axis 225 at an angle measured with respect to the z-axis. The z-axis is normal to a longitudinal axis 205 of the skew mirror 210. The skew mirror 205 is illuminated with the incident light 215 with an internal incidence angle that is measured with respect to the z-axis. The principal reflected light 220 may be reflected with internal reflection angle 180° measured with respect to the z-axis. The principal reflected light 220 may correspond to wavelengths of light residing in the red, green, and blue regions of the visible spectrum. K-space distribution 260 may have a different angle for different grating structures.

The skew mirror 210 is characterized by the reflective axis 225 at an angle measured with respect to the z-axis. The z-axis is normal to a longitudinal axis 205 of the skew mirror 210. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
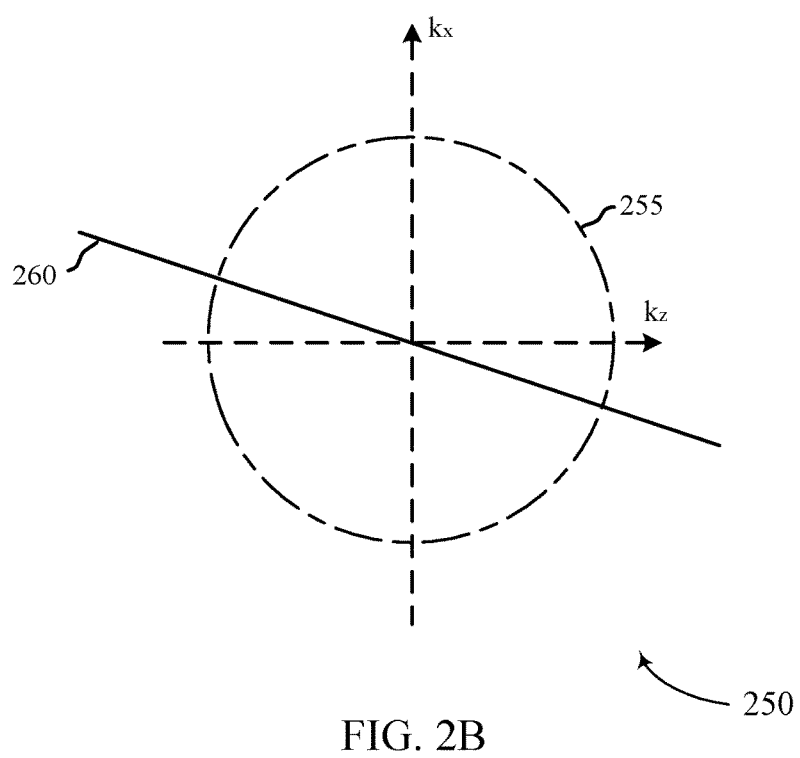
FIG. 2B illustrates a skew mirror in k-space that supports FoV enhancement in accordance with aspects of the present disclosure.

FIG. 2B illustrates a k-space representation 250 of the skew mirror 210 of FIG. 2A. The k-space distributions of spatially varying refractive index components are typically denoted $\Delta n\ (\vec{k})$. $\Delta n\ (\vec{k})$-space distribution 260 passes through the origin, and has an angle measured with respect to the z-axis, equal to that of the reflective axis 225. Recording k-sphere 255 is the k-sphere corresponding to a particular writing wavelength. K-space representation 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r\ \exp(i\ \vec{k}_r \cdot \vec{r}) \xrightarrow{3} E_r(\vec{k}) = A_r\ \delta(\vec{k} - \vec{k}_r), \quad (1)$$

where $E_r \vec{r}$ is the optical scalar field distribution at all $\vec{r} = \{x, y, z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r| = k_n$. Thus, all optical propagation vectors must lie on a sphere of radius $k_n = 2\pi\ n_0/\lambda$, where $n_0$ is the average refractive index of the hologram ("bulk index"), and is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E^*_1(\vec{r})E_2(\vec{r}) + E_1(\vec{r})E^*_2(\vec{r}), \quad (2)$$

where $E_1(\vec{r})$ is the spatial distribution of the signal first recording beam field and $E_2(\vec{r})$ is the spatial distribution of the second recording beam field. The unary operator * denotes complex conjugation. The final term in equation (2), $E_1(\vec{r})E^*_2(\vec{r})$, maps the incident second recording beam into the diffracted first recording beam. Thus the following equation may result:

$$E_1(\vec{r})E^*_2(\vec{r}) \xrightarrow{3} E_1(\vec{k}) \otimes E_2(\vec{k}), \quad (3)$$

where is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ are grating vectors from the respective hologram $\Delta n(\vec{k})$-space distributions to the origin (not shown individually). Note that by convention, wave vectors are represented by a lowercase "k" and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) \big|_{|\vec{k}|=k_n} \quad (4)$$

where $E_d(\vec{k})$ and $E_p(\vec{k})$ are k-space distributions of the diffracted beam and the probe beam, respectively; and "*" is the 3D convolution operator. The notation "$||\vec{k}|=k_n$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different from the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, typically used here when describing skew mirror properties in k-space, is analogous to the term incident light, which is typically used here when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3:
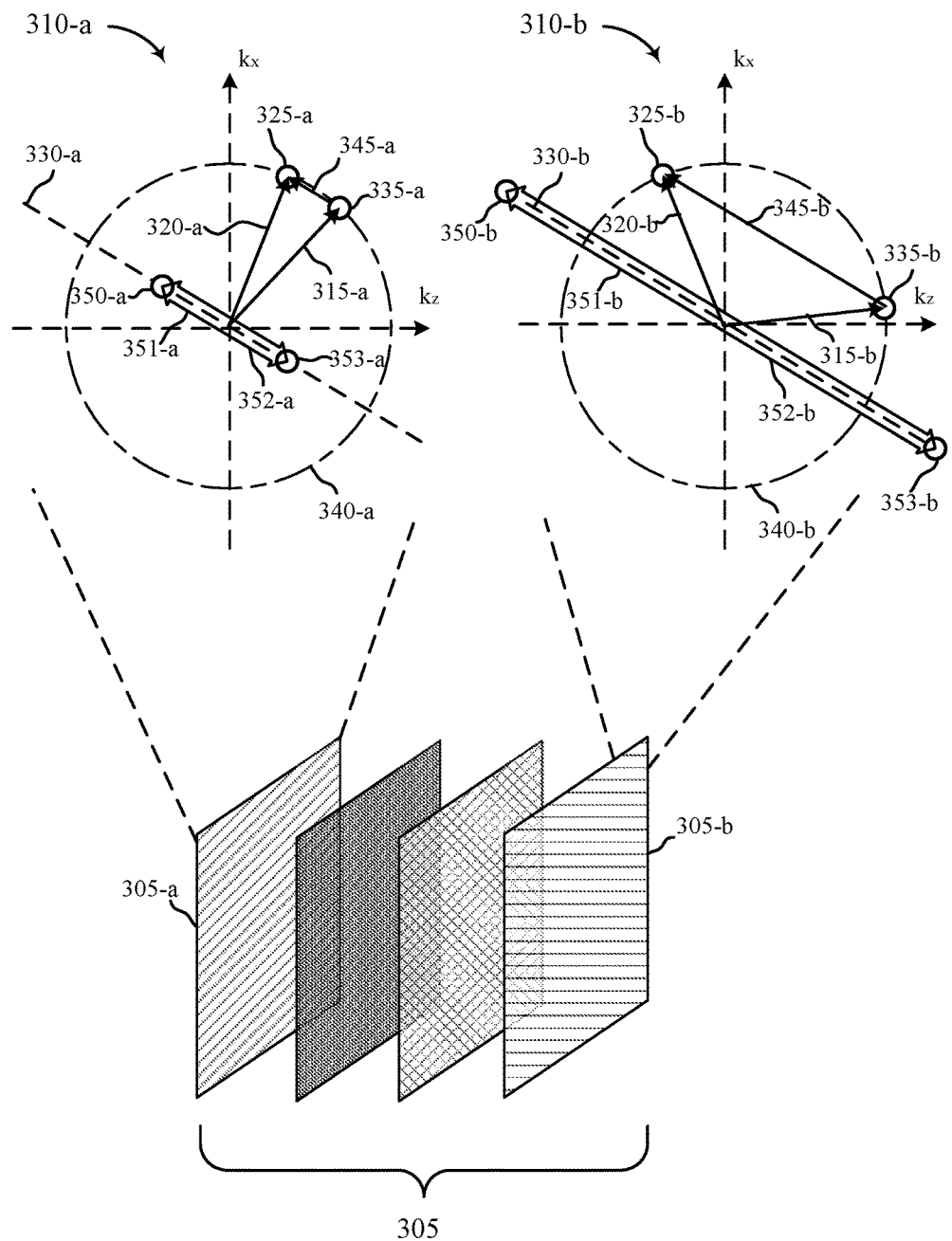
FIG. 3 is a diagram of an optical component illustrating a plurality of grating structures that supports FoV enhancement in accordance with aspects of the present disclosure.

FIG. 3 is a diagram of an optical component 300 illustrating a plurality of grating structures 305. Grating structures 305 are illustrated in an exploded view manner for discussion purposes, but these grating structures 305 may overlap and intermingle within a volume or space of a grating medium as described herein. Also, each grating structure may have a different diffraction angle response and may reflect light at a wavelength that is different from another grating structure.

Optical component 300 depicts a grating structure 305-a and a grating structure 305-b. The grating structure 305-a may have a corresponding k-space diagram 310-a, and the grating structure 305-b may have a corresponding k-space diagram 310-b. The k-space diagrams 310-a and 310-b may illustrate cases of Bragg-matched reconstruction by illuminating a hologram.

The k-space diagram 310-a may illustrate the reflection of an incident light by the grating structure 305-a. The k-space diagram 310-a is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 310-a has a positive sideband $\Delta n(\vec{k})$ k-space distribution 350-a that has an angle measured with respect to the z-axis, equal to that of the reflective axis 330-a of the grating structure 305-a. The k-space diagram 310-a also has a negative sideband Δn ($\vec{k}$)-space distribution 353-a that has an angle measured with respect to the z-axis, equal to that of the reflective axis 330-a. The k-sphere 340-a may represent visible blue light, visible green light, or visible red light.

The k-space diagram 310-a depicts a case where probe beam 335-a produces a diffracted beam k-space distribution 325-a, $E_d(\vec{k})$, that is point-like and lies on the probe beam k-sphere 340-a. The diffracted beam k-space distribution 325-a is produced according to the convolution of Equation (4).

The probe beam 335-a has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 320-a, $\vec{k}_p$ represents a probe beam wave vector 315-a, and $\vec{K}_{G+}$ represents a positive sideband grating vector 351-a. Vector 345-a represents the sum of the probe beam wave vector 315-a and the positive sideband grating vector 351-a according to the convolution of Equation (4). The k-space diagram 310-a also has a negative sideband grating vector 352-a.

The probe beam wave vector 315-a and the diffracted beam wave vector 320-a necessarily form the legs of a substantially isosceles triangle. The equal angles of this triangle are necessarily congruent with the angle of incidence and angle of reflection, both measured with respect to the reflective axis 330-a. Thus, the grating structure 305-a reflects light in a substantially mirror-like manner about the reflective axis 330-a.

The k-space diagram 310-b may illustrate the reflection of an incident light by the grating structure 305-b. The grating structure 305-b may reflect incident light at a plurality of incidence angles that are different from the incidence angles reflected by the grating structure 305-a. The grating structure 305-b may also reflect light at a different wavelength than the grating structure 305-a. The k-space diagram 310-b is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 310-b has a positive sideband Δn ($\vec{k}$)-space distribution 350-b that has an angle measured with respect to the z-axis, equal to that of the reflective axis 330-b of grating structure 305-b. The k-space diagram 310-b also has a negative sideband Δn ($\vec{k}$)k-space distribution 353-b that has an angle measured with respect to the z-axis, equal to that of the reflective axis 330-b. The k-sphere 340-b may represent visible blue light, visible green light, or visible red light. In some embodiments, the k-sphere may represent other wavelengths of electromagnetic radiation, including but not limited to ultraviolet or infrared wavelengths.

The k-space diagram 310-b depicts a case where the probe beam 335-b produces a diffracted beam k-space distribution 325-b, $E_d(\vec{k})$, that is point-like and lies on the probe beam k-sphere 340-b. The diffracted beam k-space distribution 325-b is produced according to the convolution of Equation (4).

The probe beam 335-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 320-b, $\vec{k}_p$ represents a probe beam wave vector 315-b, and $\vec{K}_{G-}$ represents a positive sideband grating vector 351-b. Vector 345-b represents the sum of the probe beam wave vector 315-b and the positive sideband grating vector 351-b according to the convolution of Equation (4). The k-space diagram 310-b also has a negative sideband grating vector 352-b.

Figure 4A:
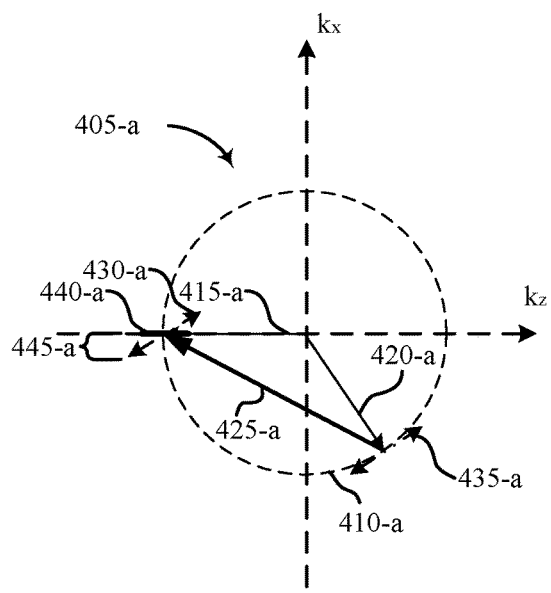
FIGS. 4A to 4C illustrates examples of a k-space diagrams of optical components associated with FoV enhancement in accordance with aspects of the present disclosure.
Figure 4B:
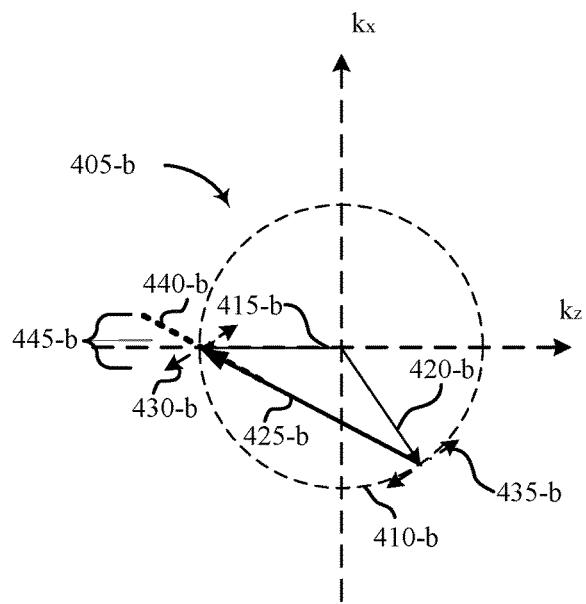
Figure 4C:
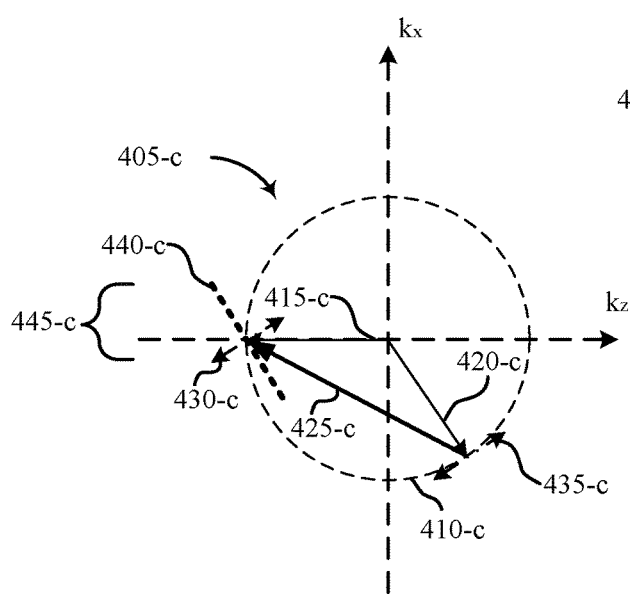

The probe beam wave vector 315-b and the diffracted beam wave vector 320-b necessarily form the legs of a substantially isosceles triangle. The equal angles of this triangle are necessarily congruent with the angle of incidence and angle of reflection, both measured with respect to the reflective axis 330-b. Thus, the grating structure 305-b reflects light in a substantially mirror-like manner about the reflective axis 330-b FIG. 4A-4C illustrate an examples of an optical components 400-a, 400-b, 400-c, associated with FoV enhancement in accordance with various aspects of the present disclosure. Optical components 400 may illustrate k-space diagrams 405. K-space diagrams may be similar to the k-space diagrams described in reference to FIG. 3. Optical component 400-a may represent a thin hologram structure that may have a corresponding k-space diagram 405-a. Optical component 400-b may represent a first grating structure (e.g., one or more volume holograms) that may have a corresponding k-space diagram 405-b. Optical component 400-c may represent a second grating structure (e.g., one or more volume holograms) that may have a corresponding k-space diagram 405-c. The k-space diagrams 405-b and 405-c may illustrate cases of Bragg-matched reconstruction by illuminating a hologram.

The k-space diagram 405-a may illustrate the reflection of an incident light by the grating structure. The k-space diagram 405-b is a representation of a mirror-like diffraction (which can be referred to as a reflection) of the probe beam by the thin hologram structure, where the probe beam angle of incidence with respect to the reflective axis is equal to the diffracted beam angle of reflection with respect to the reflective axis.

The k-space diagram 405-a may include a k-sphere 410-a, a reflected beam wave vector 415-a, an incident beam wave vector 420-a, and grating vector 425-a. By contrast, the k-space diagram 405-b may include a k-sphere 410-b, a reflected beam wave vector 415-b, an incident beam wave vector 420-b, and grating vector 425-b.

The reflected beam wave vectors 415-a and 415-b and the incident beam wave vector 420-a and 420-b necessarily form the legs of a substantially isosceles triangle. The equal angles of this triangle are necessarily congruent with the angle of incidence and angle of reflection, both measured with respect to the reflective axis. Thus, a grating structure corresponding to grating vectors 425-a and 425-b may reflect light in a substantially mirror-like manner about the reflective axis.

The k-space diagram 405-*a* may result in a change of angle of incidence mapping into a smaller change in angle of reflection. In some examples, k-space diagram 405-*a* may result in a given range of incidence angles mapping into a small FoV. In some cases, arrow 430-*a* parallel to arrow 435-*a* may represent the direction of translation of polarization density distribution 440-*a* due to a small change of incidence angle. In some cases, arrow 435-*a* tangent to k-sphere 410-*a* may represent the internal angle. For example, the shallow intercept 445-*a* between polarization density distribution 440-*a* and arrow 430-*a* may represent the resulting decreased FoV. In some cases, the incident angle may be magnified with respect to the reflective angle.

As described herein, k-space diagram 405-*b* may result in a 1:1 mapping of angle of incidence to angle of reflection in a skew mirror or skew mirror-like diffractive optical element. That is, k-space diagram 405-*b* may result in a given range of incidence angles mapping into an intermediate FoV. In some cases, arrow 430-*b* parallel to arrow 435-*b* may represent the direction of translation of polarization density distribution 440-*b* due to a small change of incidence angle. In other examples, arrow 435-*b* tangent to k-sphere 410-*b* may represent the internal angle. For example, the 1:1 intercept 445-*b* between polarization density distribution 440-*b* and arrow 430-*b* may represent an intermediate FoV produced by a skew mirror-like diffractive optical element.

The k-space diagram 405-*c* associated with optical component 400-*c* may reflect a change of angle of incidence mapping into a larger change in angle of reflection. That is, k-space diagram 405-*c* may result in a given range of incidence angles mapping into a large FoV. In some cases, arrow 430-*c* parallel to arrow 435-*c* may represent the direction of translation of polarization density distribution 440-*c* due to a small change of incidence angle. In other examples, arrow 435-*c* tangent to k-sphere 410-*c* may represent the internal angle. For example, the steep intercept 445-*c* between polarization density distribution 440-*c* and arrow 430-*c* may represent an increased FoV produced by a skew mirror-like diffractive optical element with FoV enhancement.

In some cases, two holograms may be pair-wise coherent if illumination by probe beams (e.g., incident light on the grating medium) in a fixed phase relationship produce diffracted beams also in a fixed phase relationship. In the case of non-orthogonal probe or diffracted beams, pair-wise coherence may result in a constructive or destructive interference pattern between diffracted beams. For example, if one or more holograms neighbor each other within a skew mirror or skew mirror-like diffractive optical element, non-orthogonal overlapping diffracted beams may be produced in response to a single plane-wave probe beam component. In some cases, the pair-wise coherence of the holograms may be controlled in order to achieve constructive interference among overlapping diffracted beams ("constructive coherence"). For example, this may prevent dark lines from appearing in projected images using narrow band illumination due to destructive interference between neighboring holograms.

Figure 5:
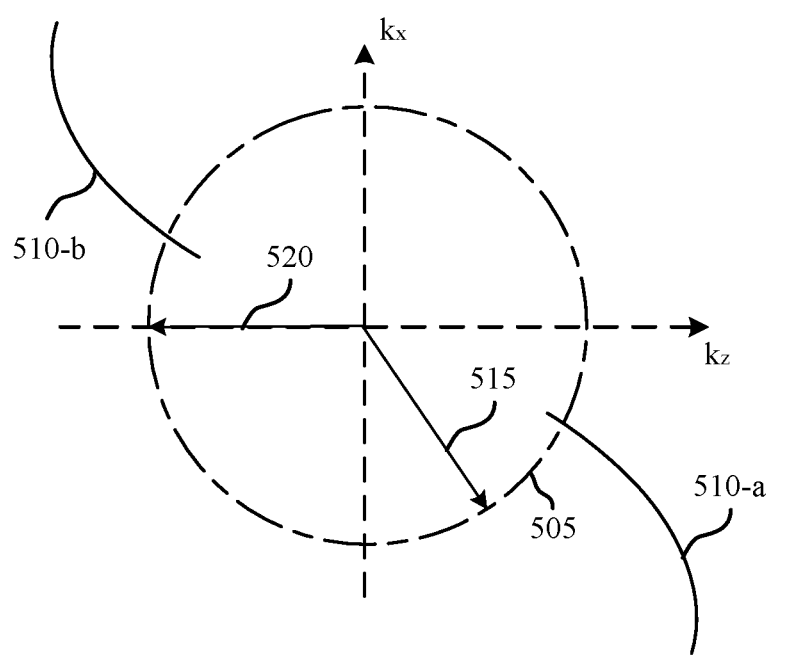
FIG. 5 illustrates an example of a k-space diagram of an optical component that supports FoV enhancement in accordance with aspects of the present disclosure.

FIG. 5 illustrates an example of a k-space diagram 500 that supports FoV enhancement in accordance with various aspects of the present disclosure. K-space diagrams may be similar to the k-space diagrams described in reference to FIGS. 3 and 4. K-space diagram 500 may include a k-sphere 505, index modulations 510-*a* and 510-*b*, incident wave vector locus 515, and reflected wave vector locus 520.

The k-space diagram 500 may illustrate the reflection of an incident light by the grating structure. Index modulations 510-*a* and 510-*b* may be created by interference between a first recording beam and a second recording beam and is typically proportional to the spatial intensity of the recording interference pattern. Index modulations 510-*a* and 510-*b* may be created by interference between a first recording beam and a second recording beam and is typically proportional to the spatial intensity of the recording interference pattern. In some examples, index modulations 510-*a* and 510-*b* may occupy an arcing pattern to uniformly reflect a smaller incident wave vector locus 515 into a larger reflected wave vector locus 520. For example, the arcing pattern of the index modulations 510-*a* and 510-*b* may represent the change in grating angle. In some cases, the grating angle may change (e.g., increases for image magnification or decreases for image reduction) as the grating frequency increases. In other examples, a reflective axis (e.g., a resulting skew angle of hologram) may increase as the grating frequency increases.

The index modulations 510-*a* and 510-*b* may represent the grating frequency that will affect a wavelength of light. In some examples, the device may introduce chromatic dispersion (i.e., light will separate into constituent colors). In some cases, cylindrical FoV enhancement may be employed in near eye displays (NEDs). In some examples, narrow band laser illumination may be used to deter the effects to chromatic dispersion.

In some cases, cylindrical FoV enhancement may be employed in light coupling devices (e.g., cross coupler and output coupler). For example, cylindrical FoV enhancement may be employed in a cross coupler to increase FoV in the vertical direction. In other examples, cylindrical FoV enhancement may be employed in an output coupler to increase FoV in horizontal direction. In some cases, cylindrical FoV enhancement may be employed in a cross coupler and an output coupler to increase FoV in vertical and horizontal directions.

Figure 6:
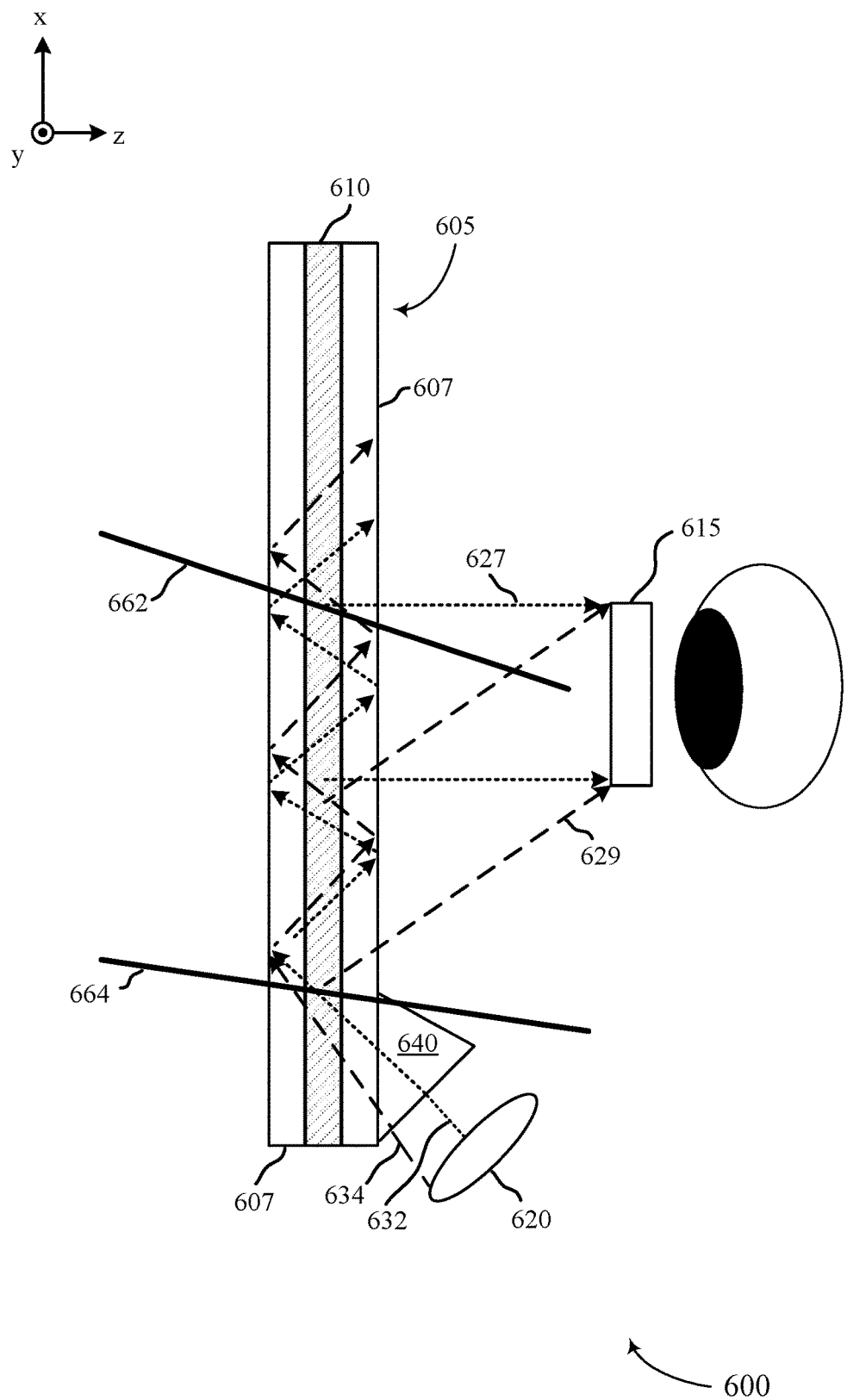
FIG. 6 illustrates an example of an optical system that supports FoV enhancement in accordance with aspects of the present disclosure.

FIG. 6 illustrates a diagram of an optical system 600 that supports FoV enhancement in accordance with various aspects of the present disclosure. Optical system 600 may be utilized in an HMD, AR, or VR application such as, but not limited to, the HMD 100 of FIG. 1. Optical system 600 may also be utilized in various optical coupling applications such as, but not limited to, large screen display and optical sensor applications. The optical system 600 may employ selective coupling to allow a skew mirror-like diffractive optical element 605 to diffract light towards a specific location, such as an eye box 615, thereby improving photometric efficiency (e.g., image brightness). This may have an advantageous effect of producing an exit pupil at the eye box 615. The exit pupil may be a fixed distance from the skew mirror-like diffractive optical element 605. An exit pupil may increase optical efficiency relative to an internal exit pupil. Refraction at the grating medium and the substrate interface, as well as at the substrate air interface, is ignored for the purpose of illustration in FIG. 6. Optical system 600 is viewed from an overhead perspective and could represent either the left or right eye of the user. For ease of description, optical system 600 will be described from the left eye perspective of the user.

The skew mirror-like diffractive optical element 605 and the grating medium 610 may both be located at least partially within a waveguide. Grating medium 610 may be at least partially or wholly enclosed by substrates 607 (e.g., glass covers or like protective layers). The skew mirror-like diffractive optical element 605 may contain one or more grating structures within the grating medium 610. A grating structure is an optical device that may reflect, diffract, and/or split incident light into beams or waves that may then continue propagating in different directions. A grating may be characterized by its diffracted angle response. For a sinusoidal grating, the diffracted angle response may be expressed by:

$$\Delta\theta_r \cos\theta_r = -\Delta\theta_i \cos\theta_i \qquad (5)$$

The diffracted angle response expresses the change in the angle of reflection, $\Delta\theta_r$, in response to small changes in the angle of incidence, $\Delta\theta_i$. In contrast, a true mirror has an angle response expressed by:

$$\Delta\theta_r = -\Delta\theta_i \qquad (6)$$

The angles in equation (5) and (6) are in k-space relative to the kz-axis.

A device substantially characterized by diffracted angle response may be said to exhibit grating-like reflective behavior, whereas a device substantially characterized by the true mirror angle response may be said to exhibit mirror-like reflective behavior. A device exhibiting grating-like reflective behavior will also exhibit a reflective axis that changes with angle of incidence, unless that reflective axis is normal to the device surface, in which case $\cos\theta_r = \cos\theta_i$. Accordingly, requirements for a relatively simple device that reflects light about a reflective axis not constrained to surface normal, and whose angle of reflection for angles of incidence spanning multiples of its angular Bragg selectivity is constant at wavelengths spanning multiples of its wavelength Bragg selectivity, may not be met by a single sinusoidal grating. As is known to those skilled in the art, a device that reflects light (e.g., a sinusoidal grating) may exhibit both angular and wavelength Bragg selectivity.

The grating medium 610 may be comprised of a photopolymer, photorefractive crystals, dichromated gelatin, photo-thermo-refractive glass, film containing dispersed silver halide particles, or other material with the ability to react to and record an incident interference pattern. The grating structures may be comprised of holograms, such as but not limited to, volume-phase holograms. Multiple holograms may be recorded into the grating medium internal volume and may thus extend below the grating medium surface. Accordingly, these holograms are sometimes referred to as volume holograms. In some implementations, each of the multiple holograms at least partially spatially overlaps at least one, but not all, of the other of the multiple holograms. In some examples, each of the multiple holograms at least partially spatially overlaps all of the other holograms. In some embodiments, some of the multiple holograms may not spatially overlap some of the other holograms.

For example, spatially overlapping holograms overlap with respect to the space occupied or volume shared by two holograms in a contiguous grating medium (e.g., two spatially overlapping holograms share or coexist in at least a portion of the same space or volume within the grating medium 610). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium 610. In examples where holograms do not spatially overlap, the two holograms do not intersect or overlap in any manner within a contiguous grating medium. For example, a first hologram may be disposed on a volumetric portion of the grating medium 610 spaced apart from a second hologram. In some embodiments, a skew mirror and/or skew mirror-like diffractive optical element may include both spatially overlapping and spatially non-overlapping holograms within the grating medium 610.

Each grating structure within the grating medium 610 may be configured to reflect light about a reflective axis of the skew mirror-like diffractive optical element 605. The reflective axis may be an example of the reflective axis 225 depicted in FIG. 2A. The reflective axis may be offset from a surface normal of the grating medium. Incident light and its reflection are bisected by the reflective axis such that the internal angle of incidence of the incident light relative to the reflective axis has the same magnitude as the internal angle of reflection of the reflected light relative to the reflective axis. That is, the incident light and its reflection may exhibit bilateral symmetry about the reflective axis. In some implementations, a grating structure may be configured to reflect light at a reflection angle that is between the plurality of incidence angles and the surface normal of the grating medium.

Each grating structure within the grating medium 610 may be configured to reflect light about a first skew axis 662 or a second skew axis 664 of the skew mirror-like diffractive optical element 605. First skew axis 662 may be associated with light 632. For example, a one degree increase in the incident angle of light 632 may increase the angle of reflection by one degree. In some cases, second skew axis 664 may be ten degrees different from first skew axis 662. Second skew axis 664 may be one skew angle that changes with the angle of incidence. The angle of first skew axis 662 and second skew axis 664 may change for each hologram.

Each grating structure within the grating medium 610 may be configured to reflect light of one or more wavelengths at a particular plurality of incidence angles (the one or more wavelengths may include at least one visible red light wavelength, one visible blue light wavelength, and one visible green light wavelength). Each grating structure within the grating medium 610 may reflect light at a plurality of incidence angles that are different from a plurality of incidence angles corresponding to a different grating structure. Each grating structure within the grating medium 610 may be comprised of a plurality of sinusoidal volume gratings.

Optical system 600 illustrates a light source or light projector 620 (e.g., micro display illuminated by a light-emitting diode). The light may enter the skew mirror-like diffractive optical element 605 through an input coupler 640. The input coupler 640 may be a prism or prism-like structure, a grating structure, a mirror or reflective structure, an edge facet or curved surface, or other input coupling techniques. The refractive index of the input coupler 640 may be index matched with a substrate 607 to which the input coupler 640 is coupled. In some examples, however, an input coupler may not be used to direct light (e.g., image-bearing light) to a skew mirror and/or skew mirror-like diffractive optical element. The light may include a range of visible light (e.g., visible red light, visible blue light, and visible green light).

In some cases, a volume holographic grating may include holographic structures that are Bragg matched for combinations of angles and wavelengths that differ from each other. That is, within the grating medium, wavelengths of light that differ from each other are reflected along a same reflective axis based on holographic grating structures that differ from each other.

Therefore, according to examples of the present disclosure, incident light 632 may be selectively reflected by a hologram that is at least partially disposed in a region of the grating medium 610 and will cause incident light 632 to be reflected as reflected light ray 627 toward eye box 615. That is, incident light 632 may be selectively reflected for light rays having an angle of incidence corresponding to incident light 632. In some examples, incident light 634 may be selectively reflected by a hologram that is at least partially disposed in a region of the grating medium 610 and will cause incident light 634 to be reflected as reflected light ray 629 toward eye box 615. That is, incident light 634 may be selectively reflected for light having an angle of incidence corresponding to incident light 634.

Optical system 600 is illustrated as reflecting light at a plane residing approximately at the center of the grating medium 610. However, persons skilled in the art recognize that light is typically reflected throughout the grating structure rather than at a specific plane. Additionally, for each reflected light ray intended to be directed to the eye box 615, one or more holograms in one or more grating structures of the grating medium 610 may be written for various wavelengths of visible red light, various wavelengths of visible blue light, and various wavelengths of visible green light.

Inventive aspects of the present disclosure are illustrated by the non-limiting examples of FIG. 1 through 6. For example, an optical device (e.g., skew mirror-like diffractive optical element 605) may include a grating medium, a first grating structure within the grating medium, the first grating structure being configured to reflect light of a wavelength about a first reflective axis offset from a surface normal of the grating medium at a first incidence angle, and a second grating structure within the grating medium, the second grating structure being configured to reflect light of the wavelength about a second reflective axis offset from the surface normal of the grating medium at a second incidence angle different from the first incidence angle, the second reflective axis being different from the first reflective axis. In some examples, the first incidence angle and the second incidence angle may differ by at least 5° and the second incidence angle may be greater than the first incidence angle.

Additionally or alternatively, an optical device may also include a third grating structure within the grating medium, the third grating structure including a plurality of grating vectors, each of the plurality of grating vectors having a grating angle that covaries with a grating frequency associated with the third grating structure. In some examples, the third grating structure may be configured to reflect light of the wavelength such that an incidence angle change of a first angular value between consecutive incidence angles associated with the plurality of grating vectors results in a reflective angle change of a scaling factor (e.g., a 2× for magnification or 0.5× for contraction) multiplied by the first angular value (e.g., 1°) between corresponding reflective angles associated with the consecutive respective incidence angles.

In some examples, each grating vector of the plurality of grating vectors of the third grating structure may correspond to a respective incidence angle and wavelength (e.g., a small range of incidence angles may Bragg match a particular grating vector at a specific wavelength). The third grating structure may be configured to reflect light of the wavelength about a reflective axis corresponding to a respective grating vector at the respective incidence angle. In some examples, the respective incidence angle for each grating vector may have a value between 65° and 77° with respect to the grating medium.

In some examples, the first grating structure may be configured to reflect light of the wavelength, about the first reflective axis offset from the surface normal of the grating medium, at a first range of incidence angles including the first incidence angle. Each incidence angle of the first range of incidence angles may be less than the second incidence angle. In some examples, the first grating structure comprises at least three holograms. Each of the at least three holograms may correspond to a unique incidence angle within the first range of incidence angles. A grating vector for each of the at least three holograms may be a same value.

In some examples, the first grating structure comprises at least three holograms. Each of the at least three holograms may correspond to a unique incidence angle within the first range of incidence angles. An adjacent |∆K$_G$| for the at least three holograms may have a mean value that resides between $1.0 \times 10^4$ and $1.0 \times 10^6$ radians per meter (rad/m) thereby showing substantial similarity in ab absolute value of the difference in grating vectors.

Alternatively or additionally, at least one of the first grating structure or the second grating structure comprises a sinusoidal volume grating. The wavelength of light for which the grating structure may be configured to may include one of: a visible red light wavelength, a visible blue light wavelength, or a visible green light wavelength.

Additional examples and various implementations are contemplated using the light homogenizing techniques described herein.

Figure 7:
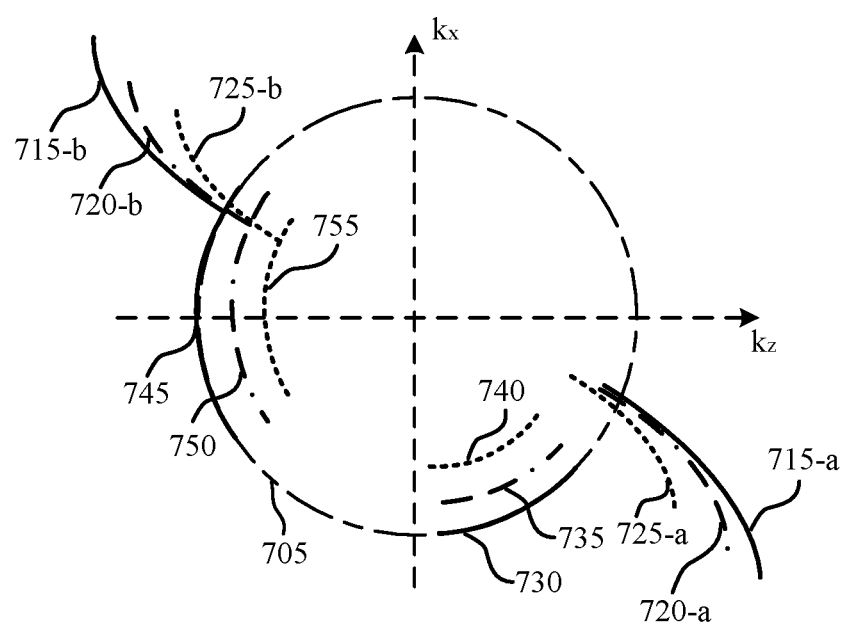
FIG. 7 illustrates an example of a k-space diagram of an optical component that supports FoV enhancement in accordance with aspects of the present disclosure.

FIG. 7 illustrates an example of a k-space diagram 700 that supports FoV enhancement in accordance with various aspects of the present disclosure. K-space diagram 700 may be similar to the k-space diagrams described in reference to FIGS. 3, 4 and 5. K-space diagram 700 may include a k-sphere 705, and index modulations 715, 720, and 725. K-space diagram 700 may also include first incident locus 730, second incident locus 735, and third incident locus 740. K-space diagram 700 may include first reflected locus 745, second reflected locus 750, and third reflected locus 755.

In some cases, each index modulation occupies a separate arcing locus that corresponds to a grating frequency that will affect a wavelength of light (e.g., red, blue, green). For example, first index modulations 715-*a* and 715-*b* may correspond to visible blue light wavelength. In other examples, second index modulations 720-*a* and 720-*b* may correspond to visible green light wavelength. In other examples, third index modulations 725-*a* and 725-*b* may correspond to visible red light wavelength.

In some examples, cross talk between holograms may be mitigated by employing skew mirror pupil equalization techniques (e.g., reduction of the number of holograms written) for writing holograms in portions of the grating medium. For example, cross talk between holograms may be mitigated by employing separate waveguides for some index modulation patterns (e.g., index modulation patterns associated with a wavelength of light).

To employ separate waveguides for each index modulation pattern (e.g., index modulation patterns associated with a wavelength of light), a multi-layer waveguide may include index of refraction gaps (e.g., air gaps) between each waveguide in order for total internal reflection (TIR) to occur within each separate waveguide (e.g., caused by a boundary condition between an index of refraction of the waveguide and an air gap).

In some examples, the edge of the index modulation near the center of the k-space diagram 700 may correspond to the grating structures on the side near to a light coupling device. In other examples, the edge of the index modulation near the outside of the k-space diagram 700 may correspond to the grating structures on the side far from the light coupling device. For example, a point on the first index modulation 715-a and a point on the second index modulation 750-a may be the same distance from the origin of the k-space diagram 700 and therefore the grating structures may have the same frequency. The greater the spatial distance between each index modulation at a radius, the larger the possible eye box. In some cases, laser light may be used to minimize the chromatic blurring of pixels in the horizontal direction for each index modulation.

In some cases, the incident locus may map pixels of light from the incident locus onto pixels of light on the reflected locus. For example, first incident locus 730 may map a pixel of light onto a pixel of light on first reflected locus 745. In some examples, the incident locus may correspond to a wavelength of light (e.g., red, blue, green). For example, the first incident locus 730 may correspond to visible blue light wavelength. In other examples, the second incident locus 735 may correspond to visible green light wavelength. In other examples, the third incident locus 740 may correspond to visible red light wavelength.

The reflected locus may represent the pixels displayed and incorporated into the FoV. In some examples, the reflected locus may correspond to a wavelength of light (e.g., red, blue, green). For example, the first reflected locus 745 may correspond to visible blue light wavelength. In other examples, the second reflected locus 750 may correspond to visible green light wavelength. In other examples, the third reflected locus 755 may correspond to visible red light wavelength.

Figure 8:
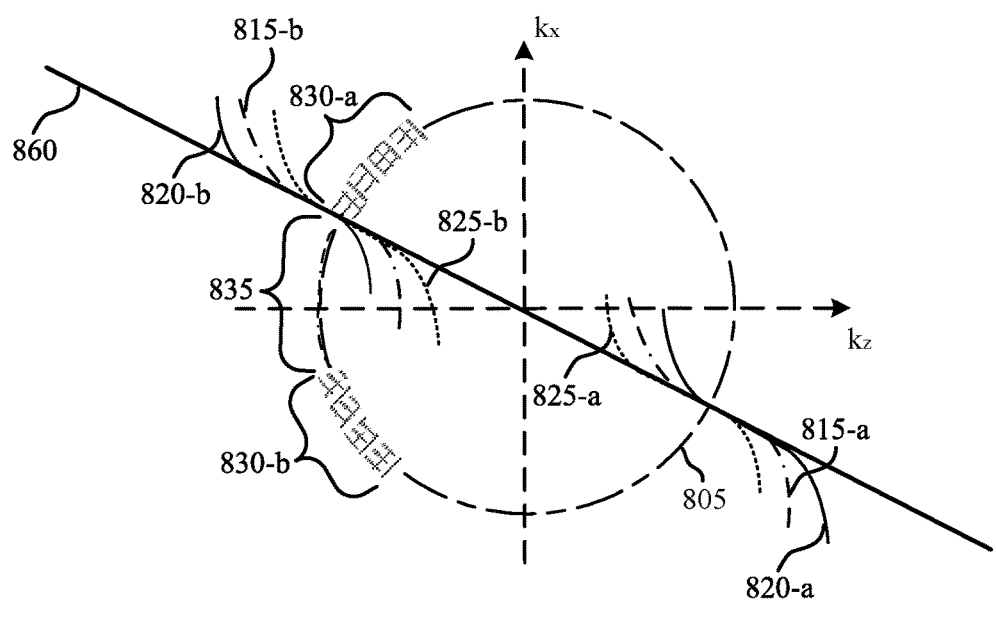
FIG. 8 illustrates an example of a k-space diagram of an optical component that supports FoV enhancement in accordance with aspects of the present disclosure.

FIG. 8 illustrates an example of a k-space diagram 800 that supports FoV enhancement in accordance with various aspects of the present disclosure. K-space diagram 800 may be similar to the k-space diagrams described in reference to FIGS. 3, 4, 5 and 7. K-space diagram 800 may include a k-sphere 805, and index modulations 815, 820, and 825.

K-space diagram 800 may be an example of foveated FoV enhancement. In some cases, foveated FoV enhancement may be an example of cylindrical FoV enhancement selectively applied to parts of the FoV. For example, holograms corresponding to the central portion of the FoV (i.e., the fovea) may form a locally flat (non-cylindrical) skew mirror-like portion. In other examples, holograms corresponding to the edges of the FoV (i.e., the periphery) may form a locally cylindrical skew mirror-like portion.

In some cases, each index modulation may correspond to a grating frequency that will effect a wavelength of light (e.g., red, blue, green). For example, first index modulations 815-a and 815-b may correspond to visible blue light wavelength. In other examples, second index modulations 820-a and 820-b may correspond to visible green light wavelength. In other examples, third index modulations 825-a and 825-b may correspond to visible red light wavelength.

In some cases, holograms corresponding to the fovea of each index modulation are aligned along a first reflective axis. In other examples, holograms corresponding to the periphery of each index modulation are not aligned along the first reflective axis, but have a different reflective axis. For example, reflective axis 860 represents the reflective axis of the holograms corresponding to the central portion of the FoV (i.e., the fovea) of each index modulation, but does not represent a reflective axis for holograms corresponding to the edges of the FoV (i.e., the periphery) of each index modulation. The pixels in the periphery may be stretched horizontally, reducing resolution at the edges of the field (e.g., anamorphic distortion) and may exhibit chromatic blur. For example, sections 830-a and 830-b may represent the periphery of the FoV including anamorphic distortion and chromatic blur. In other examples, section 835 may represent the fovea of the FoV with an absence of anamorphic distortion and chromatic blur.

In some cases, foveated FoV enhancement may be employed in light coupling devices (e.g., cross coupler and output coupler). For example, foveated FoV enhancement may be employed in a cross coupler to increase FoV in the vertical direction. In other examples, foveated FoV enhancement may be employed in an output coupler to increase FoV in horizontal direction. In some cases, foveated FoV enhancement may be employed in a cross coupler and an output coupler to increase FoV in vertical and horizontal directions.

Inventive aspects of the present disclosure are illustrated by the non-limiting examples of FIG. 1 through 8. For example, an optical device a grating structure configured to reflect light of a plurality of wavelengths at a first incidence angle and a second grating structure may be configured to reflect light of the plurality of wavelengths at the second incidence angle. In some examples of the optical device described above, the second grating structure may be at least partially non-overlapping with the first grating structure thereby conserving dynamic range of the grating medium.

Additionally or alternatively, an additional or second grating medium may disposed in a waveguide different from a waveguide in which the grating medium may be disposed. These waveguide may be separated by an index of refraction gap. In some examples, an optical device may also include an additional or fourth grating structure within the second grating medium. The fourth grating structure may be configured to reflect light of a second wavelength different from the wavelength about a fourth reflective axis offset from the surface normal of the second grating medium at the first incidence angle. The fourth reflective axis may be substantially parallel to the first reflective axis. An additional or fifth grating structure may be also be disposed within the second grating medium. The fifth grating structure may be configured to reflect light of the second wavelength about a fifth reflective axis offset from the surface normal of the second grating medium at the second incidence angle. The fifth reflective axis being substantially parallel to the second reflective axis.

Additional examples and various implementations are contemplated using the light homogenizing techniques described herein.

Figure 9:
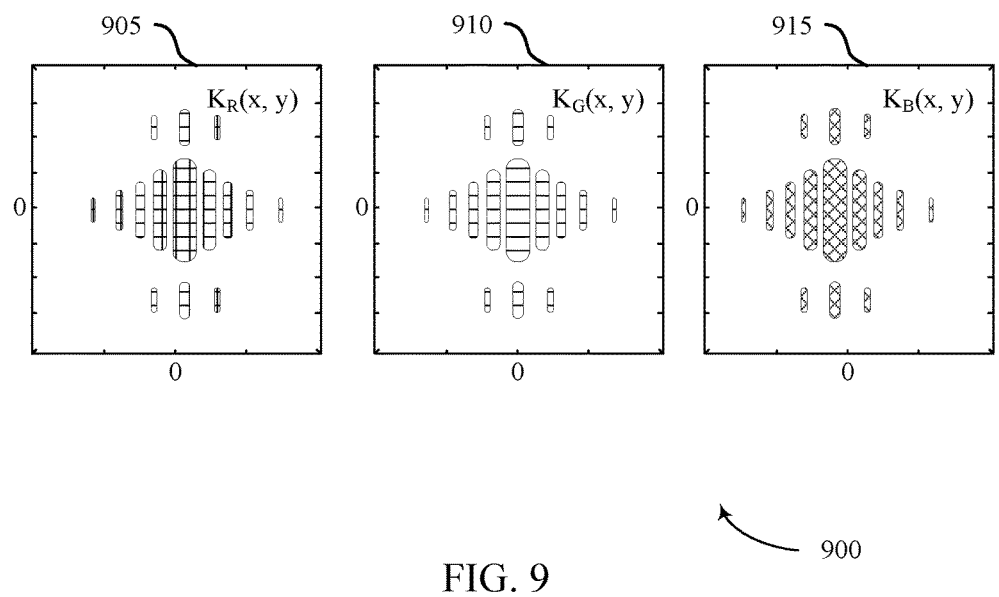
FIG. 9 illustrates an example of a plot that supports FoV enhancement in accordance with aspects of the present disclosure.

FIG. 9 illustrates an example of a plot 900 that supports FoV enhancement in accordance with various aspects of the present disclosure. Plot 900 may include first blur kernel plot 905 that may correspond to wavelength of red light, second blur kernel plot 910 that may correspond to a wavelength of green light, and third blur kernel plot 915 that may correspond to visible blue light wavelength.

In some cases, projected images for foveated FoV enhancement may be pre-processed. For example, the pre-process projected image may introduce a vertical blur similar to the horizontal blur to mitigate chromatic blurring. In some examples, mixing portions of all three incoming color channels (i.e., red, green, blue) and combining with a blur kernel may reduce the available color range. In other examples, mixing portions of the three incoming color channels may prevent pure-color edges where chromatic blurring may be most apparent.

In some cases, blue kernels may be vertical in shape and offset in the horizontal direction. For example, first blur kernel plot 905 may be offset in the horizontal direction to break up vertical edges where chromatic blurring may occur. In other examples, blur kernels may be offset horizontally from each other in the blur direction in order to break up vertical edges. In some cases, a single set of blur kernels may be applied to the periphery of digital plane of the image. For example, a different sets of blur kernels may be applied to different portions of the periphery of the digital plane of the image. In some examples, a continuous spatially-varying set of blur kernels may be applied.

In some examples, the image may be pre-processed using blur kernels expressed by:

$$R'(x,y)=[0.8R(x,y)+0.2G(x,y)+0.2B(x,y)]*K_R(x,y)$$

$$G'(x,y)=[0.2R(x,y)+0.8G(x,y)+0.2B(x,y)]*K_G(x,y)$$

$$B'(x,y)=[0.2R(x,y)+0.2G(x,y)+0.8B(x,y)]*K_B(x,y)$$

where R'(x, y) may correspond to the digitally processed plane, R(x, y) may correspond to the actual digital plane, and $K_R(x, y)$ may correspond to the coordinates of a pixel or pixels of an image pixel map for visible red light wavelength. Similarly, G'(x, y) may correspond to the digitally processed plane, G(x, y) may correspond to the actual digital plane, and $K_G(x, y)$ may correspond to the coordinates of a pixel or pixels of an image pixel map for visible green light wavelength. In some cases, B'(x, y) may correspond to the digitally processed plane, B(x, y) may correspond to the actual digital plane, and $K_B(x, y)$ may correspond to the coordinates of a pixel or pixels of an image pixel map for visible blue light wavelength.

Figure 10:
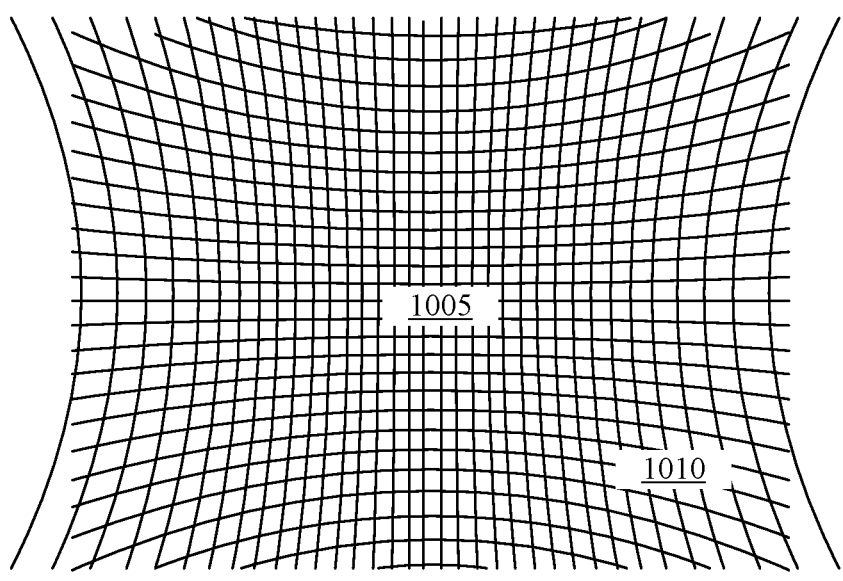
FIG. 10 illustrates an example of a resolution mapping that supports FoV enhancement in accordance with various aspects of the present disclosure.

FIG. 10 illustrates an example of a resolution mapping 1000 that supports FoV enhancement in accordance with various aspects of the present disclosure. Resolution mapping 1000 may include a center region 1005 and a peripheral region 1010. In some case, there may be a FoV tradeoff between large FoV and high resolution. For example, high resolution may be preferred in the center region 1005 of the FoV more than in the peripheral region 1010 of the FoV. To produce a higher resolution image near the center region 1005 of the FoV and a lower resolution image at the peripheral region 1010 of the FoV, optical pincushion distortion in the projector lens or other optics may be employed.

Figure 11A:
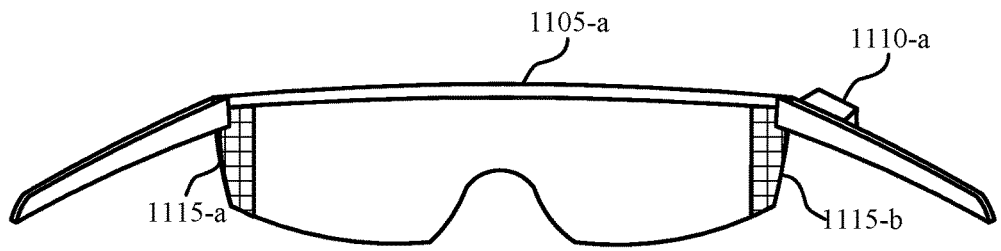
FIGS. 11A and 11B shows a diagram of an optical device and system that supports FoV enhancement in accordance with aspects of the present disclosure.
Figure 11B:
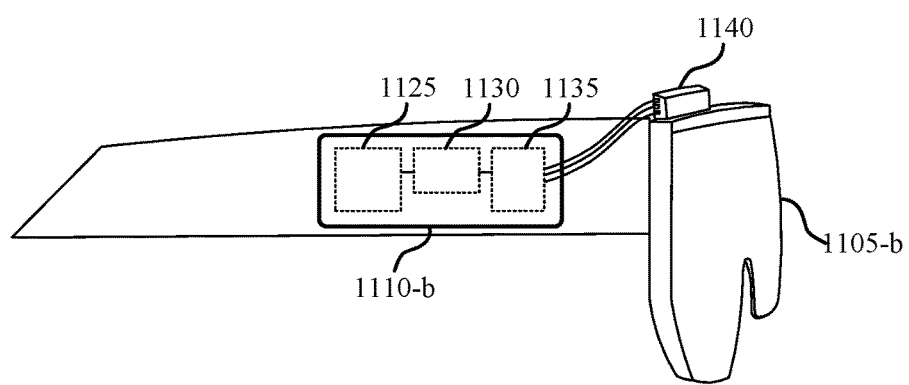

FIGS. 11A and 11B illustrates an example of an optical structures 1100-a and 1100-b that supports FoV enhancement in accordance with various aspects of the present disclosure. Optical structure 1100-a may include head mounted display 1105-a, housing 1110-a, and peripheral LEDs 1115-a and 1115-b. In some cases, peripheral vision may be sensitive to motion and experience low resolution. In other examples, motion cues may be provided at the edge of peripheral vision. For example, peripheral LED 1115-a and 1115-b may be employed at the edges of head mounted display 1105-a to improve the perception of peripheral vision.

Optical structure 1100-b may include may include head mounted display 1105-a, housing 1110-b, and light source 1140. Housing 1110-b may include image input manager 1125, pre-distortion manager 1130, and light projection manager 1135. In some examples, image input manager 1125 may image information received through wireless or wired communication. In other examples, information may be hardwired or sent via Bluetooth to image input manager 1125. In some cases, pre-distortion manager 1130 may be a digital or analog system. For example, pre-distortion manager 1130 may apply blur kernels with respect to FIG. 9. In some cases, light projection manager 1135 may take the pre-distorted image and send a signal to the light source 1140. For example, light projection manager 1135 may actuate the peripheral LEDs 1115-a and 1115-b on head mounted display 1105-a.

In some cases, housing 1110-b may include components for bi-directional communications including components for transmitting and receiving communications, including a processor, a memory, a software, an I/O controller, and an user interface for controlling the head mounted display. These components may be in communication via one or more buses.

The processor may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions (e.g., functions or tasks supporting field of view enhancement).

The memory may include random access memory (RAM) and read only memory (ROM). The memory may store computer-readable, computer-executable software including instructions that, when executed, cause the processor to perform various functions described herein. In some cases, the memory may contain, among other things, a basic input/output system (BIOS) which may control basic hardware and/or software operation such as the interaction with peripheral components or devices.

The software may include code to implement aspects of the present disclosure, including code to support field of view enhancement. The software may be stored in a non-transitory computer-readable medium such as system memory or other memory. In some cases, the software may not be directly executable by the processor but may cause a computer (e.g., when compiled and executed) to perform functions described herein.

The I/O controller may manage input and output signals for the optical device. The I/O controller may also manage peripherals not integrated into the optical device. In some cases, the I/O controller may represent a physical connection or port to an external peripheral. In some cases, the I/O controller may utilize an operating system such as iOS®, ANDROID®, MS-DOS®, MS-WINDOWS®, OS/2®, UNIX®, LINUX®, or another known operating system. In other cases, the I/O controller may represent or interact with a modem, a keyboard, a mouse, a touchscreen, or a similar device. In some cases, the I/O controller may be implemented as part of a processor. In some cases, a user may interact with the optical device via the I/O controller or via hardware components controlled by the I/O controller.

Inventive aspects of the present disclosure are illustrated by the non-limiting examples of FIGS. 1 through 11B. For example, an optical device or system may include a light source for providing image-bearing light, an optical lens, and a pre-distortion manager for applying a blur kernel to a pixel proximal to an edge of a FoV associated with an image of the image-bearing light. The optical lens may comprise a light input section of the optical lens for receiving the image-bearing light and a grating medium disposed within the optical lens operatively coupled to the light input section. The blur kernel may be associated with a particular color, and the blur kernel of a particular or predominant color may include other colors mixed in the blur kernel (e.g., to soften color contrasts). The pre-distortion manager may apply the blur kernel to a pixel or pixels of an image that are proximal to the edges of the image. This pre-distortion or pre-compensation technique may offset the distortion caused by expanding the FoV of an image using diffractive optical elements.

Additionally or alternatively, a periphery light source proximal to an edge of the optical lens. A light projection manager may control the periphery light source such that a particular color or color combination emission from the periphery light source is coordinated or matched with a corresponding edge of the FoV of the projected image.

Additional examples and various implementations are contemplated using the light homogenizing techniques described herein.

Figure 12:
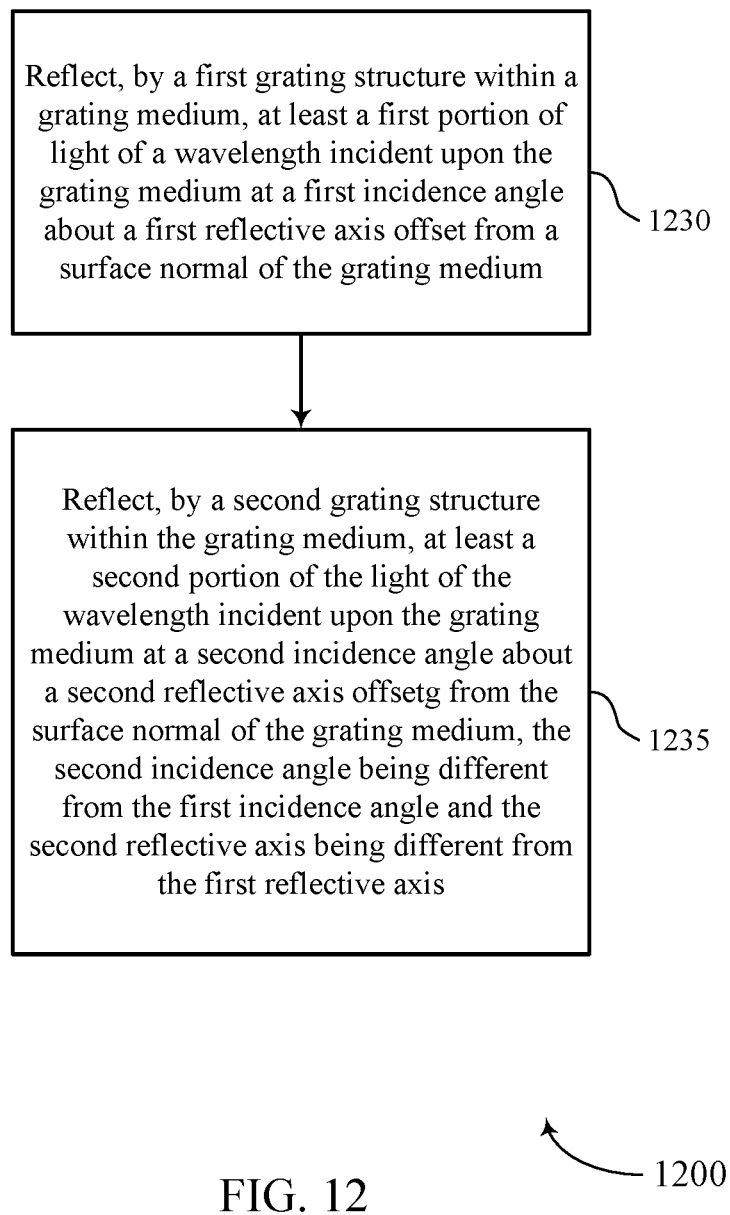
FIG. 12 illustrates a method for FoV enhancement in accordance with aspects of the present disclosure.

FIG. 12 shows a flowchart illustrating a method 1200 for FoV enhancement in accordance with aspects of the present disclosure. The operations of method 1200 may be implemented by an optical device or its components as described herein. In some examples, an optical device may execute a set of codes to control the functional elements of the device to perform the functions described below. Additionally or alternatively, the optical device may perform aspects of the functions described below using special-purpose hardware.

At block 1205 the optical device may reflect, by a first grating structure within a grating medium, at least a first portion of light of a wavelength incident upon the grating medium at a first incidence angle about a first reflective axis offset from a surface normal of the grating medium. The operations of block 1205 may be performed according to the techniques described herein.

At block 1210 the optical device may reflect, by a second grating structure within the grating medium, at least a second portion of the light of the wavelength incident upon the grating medium at a second incidence angle about a second reflective axis offset from the surface normal of the grating medium, the second incidence angle being different from the first incidence angle and the second reflective axis being different from the first reflective axis. The operations of block 1210 may be performed according to the techniques described herein.

In some examples, the optical device may reflect, by a third grating structure within the grating medium and including a plurality of grating vectors, at least a third portion of light of the wavelength such that an incidence angle change of a first angular value between consecutive incidence angles associated with the plurality of grating vectors results in a reflective angle change of a scaling factor multiplied by the first angular value between corresponding reflective angles associated with the consecutive respective incidence angles.

It should be noted that these methods and processes describe possible implementations, and that the operations and the steps may be rearranged or otherwise modified such that other implementations are possible. In some examples, aspects from two or more of the methods or processes described herein may be combined. For example, aspects of each of the methods and processes may include steps or aspects of the other methods, or other steps or techniques described herein.

The description herein is provided to enable a person skilled in the art to make or use the disclosure. Various modifications of the subject technology will be readily apparent to those skilled in the art given the benefit of the present disclosure, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Terminology:

The term "approximately," refers to plus or minus 10% of the value given.

The term "about," refers to plus or minus 20% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space).

The term "eye box" refers to a two-dimensional area outlining a region wherein a human pupil may be placed for viewing the full field of view at a fixed distance from a grating structure.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. A head mounted display device, comprising:
    a predistortion manager that receives an image and that is configured to produce a pre-distorted image based on the received image;
    a light source configured to produce image-bearing light that includes the pre-distorted image; and
    an optical lens comprising:
        a light input section configured to receive the image-bearing light produced by the light source,
        a grating medium disposed within the optical lens and operatively coupled to the light input section, and
        grating structures in the grating medium and configured to diffract the image-bearing light received by the light input section, wherein the predistortion manager is configured to produce the pre-distorted image by applying a blur kernel to a pixel proximal to an edge of a field of view associated with the received image, the blur kernel being configured to offset a distortion of the image-bearing light associated with diffraction of the image-bearing light by the grating structures.

2. The head mounted display device of claim 1, further comprising:
    a periphery light source proximal to an edge of the optical lens; and
    a light projection manager for controlling the periphery light source.

3. The head mounted display device defined in claim 2, wherein the light projection manager is configured to control the periphery light source to emit light of a color that corresponds to a color of the edge of the field of view associated with the received image.

4. The head mounted display device defined in claim 2, wherein the periphery light source comprises light emitting diodes.

5. The head mounted display device defined in claim 1, wherein the blur kernel is associated with a particular color.

6. The head mounted display device defined in claim 1, wherein the pre-distortion manager is configured to apply the blur kernel to a plurality of pixels proximal to the edge of the field of view.

7. A head mounted display device, comprising:
    a pre-distortion manager configured to produce a pre-distorted image by applying a blur kernel to a set of pixels in an undistorted image, the set of pixels being proximal to edges of a field of view of the undistorted image;
    a light source configured to generate image-bearing light that includes the pre-distorted image; and
    an optical system that includes a grating medium configured to receive the image-bearing light from the light source and volume holograms in the grating medium configured to diffract the image-bearing light while producing a distortion in the image-bearing light, wherein the blur kernel is configured to compensate for the distortion produced by the volume holograms in diffracting the image-bearing light.

8. The head mounted display device defined in claim 7, further comprising:
    an image input manager configured to receive the undistorted image and to provide the undistorted image to the pre-distortion manager.

9. The head mounted display device defined in claim 8, wherein the input image manager is configured to receive the undistorted image over a wireless link.

10. The head mounted display device defined in claim 9, wherein the wireless link comprises a Bluetooth link.

11. The head mounted display device defined in claim 7, wherein the grating medium is disposed in a waveguide and wherein the optical system further comprises an input coupler configured to couple the image-bearing light into the waveguide and towards the grating structures.

12. The head mounted display device defined in claim 11, wherein the light source comprises light emitting diodes.

13. The head mounted display device defined in claim 7, wherein the pre-distortion manager is configured to apply a plurality of different blur kernels to the set of pixels.

14. The head mounted display device defined in claim 13, wherein each blur kernel of the plurality of different blur kernels is associated with a different respective color.

15. A head mounted display device comprising:
    a pre-distortion manager configured to receive an image and configured to generate a pre-distorted image based on the received image;
    a light source configured to generate image-bearing light that includes the pre-distorted image; and
    an optical system configured to receive the image-bearing light generated by the light source, the optical system comprising:
        a grating medium, and
        grating structures in the grating medium, wherein the grating structures are configured to diffract the image-bearing light towards an eye box while expanding a field of view associated with the image received by the pre-distortion manager, wherein diffraction of the image-bearing light by the grating structures introduces a distortion to the image-bearing light, and wherein the pre-distortion manager is configured to generate the pre-distorted image by applying a blur kernel to at least one pixel proximal to an edge of the image, the blur kernel being configured to compensate for the distortion introduced by the grating structure to the image-bearing light.

16. The head mounted display device defined in claim 15, wherein the pre-distortion manager is configured to apply a plurality of different blur kernels to the at least one pixel.

17. The head mounted display device defined in claim 16, wherein each blur kernel of the plurality of blur kernels is associated with a different respective color.

18. The head mounted display device defined in claim 15, wherein the light source comprises light emitting diodes.

19. The head mounted display device defined in claim 15, wherein the optical system further comprises a light input section configured to receive the image-bearing light from the light source and to provide the image-bearing light to the grating structures.

20. The head mounted display device defined in claim 15, wherein the optical system comprises an optical lens.

* * * * *